Sept. 30, 1924.

O. A. HERRMANN

SEWAGE TREATING APPARATUS

Filed Jan. 5, 1923 2 Sheets-Sheet 1

1,510,223

INVENTOR.
Otto A. Herrmann
BY H. G. Manning
ATTORNEY

Sept. 30, 1924.
O. A. HERRMANN
SEWAGE TREATING APPARATUS
Filed Jan. 5, 1923
1,510,223
2 Sheets-Sheet 2
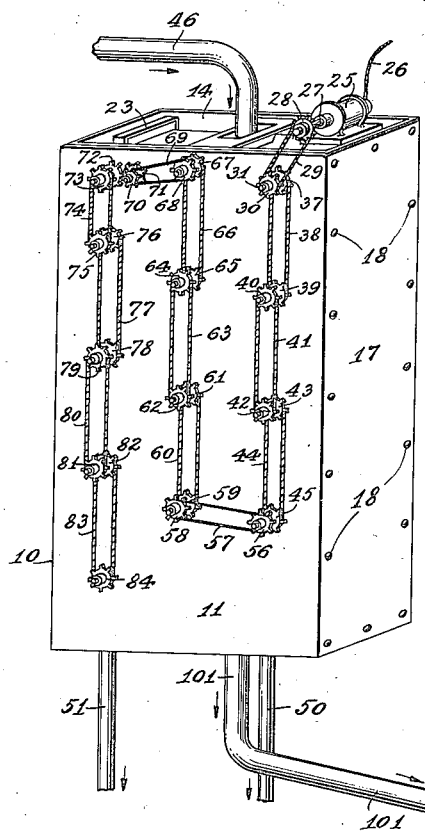
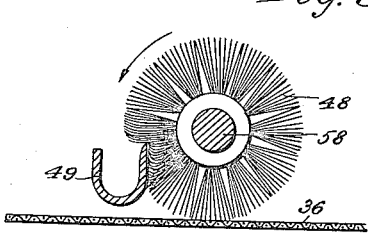
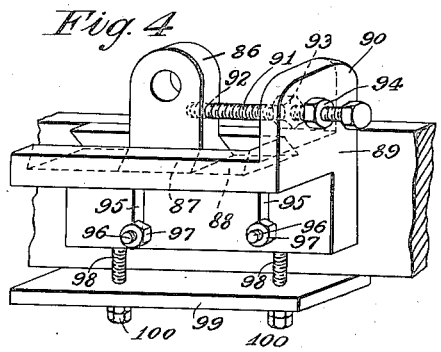
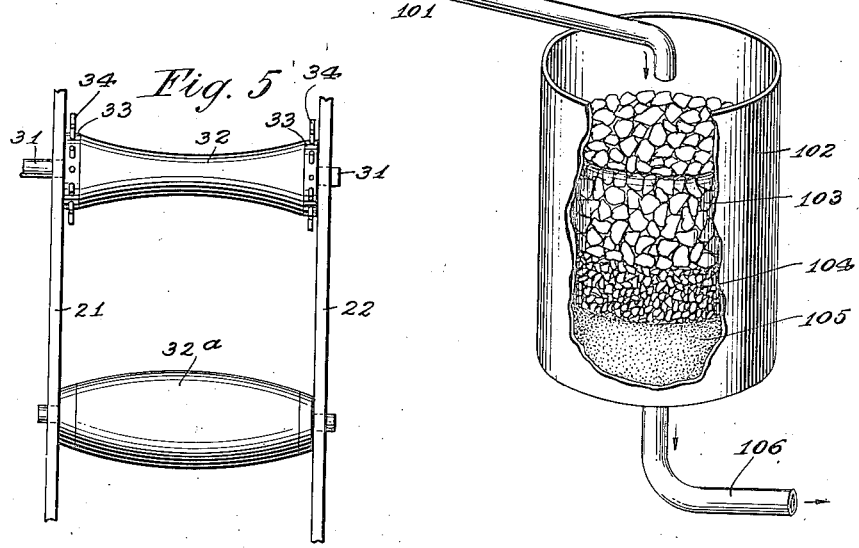
INVENTOR.
Otto A. Herrmann
BY H. G. Manning
ATTORNEY Patented Sept. 30, 1924.

1,510,223

UNITED STATES PATENT OFFICE.

OTTO A. HERRMANN, OF WATERBURY, CONNECTICUT.

SEWAGE-TREATING APPARATUS.

Application filed January 5, 1923. Serial No. 610,797.

*To all whom it may concern:*

Be it known that I, OTTO A. HERRMANN, a citizen of the United States, and a resident of Waterbury, county of New Haven, and State of Connecticut, have invented certain new and useful Improvements in Sewage-Treating Apparatus, of which the following is a specification.

This invention relates to apparatus for treating sewage and more particularly to an apparatus for purifying raw sewage and for causing a separation of a large percentage of the solid matter from the liquid matter of said raw sewage.

One object of the invention is to provide a casing within which a series of sewage filter units are arranged, one above the other, each filter unit comprising an endless perforated screen of flexible wire mesh.

A further object is to provide an apparatus of the above nature in which the sludge and other relatively solid material collecting on the horizontal stretches of the filter screens will be cleaned off by means of rotating brushes, said brushes in turn being cleaned by a series of inclined scraping troughs through which the sludge is removed from the apparatus.

A further object is to provide an effluent treatment tank for further purifying the liquid components of the sewage which have passed through all of the filter units.

A further object is to provide a sewage treatment apparatus adapted to receive raw sewage at one end, eliminate a large proportion of the water therefrom, and discharge the relatively dry solid matter in condition to be further treated for producing a material which may be used as fertilizer.

A further object is to provide a sewage disposal plant which will be comparatively simple in construction, compact in size, cheap to manufacture, easy to erect, and very efficient and durable in use.

With these and other objects in view, there has been illustrated on the accompanying drawings one form in which the invention may be conveniently embodied in practice.

Fig. 2 is a perspective view, on a considerably reduced scale, of the sewage treating apparatus and effluent treating tank—the latter being shown partly broken away.

Fig. 3 is a side sectional view of a portion of one of the sewage filtering screens with its cleaning brush and brush-scraping trough shown in their relative positions.

Fig. 4 is a perspective view of the brush adjusting device by means of which the pressure of the brush upon the screen and trough may be readily changed whenever desired.

Fig. 5 is an end view of a pair of complementary concave and convex pulleys for driving one of the endless filter screens.

Figure 1:
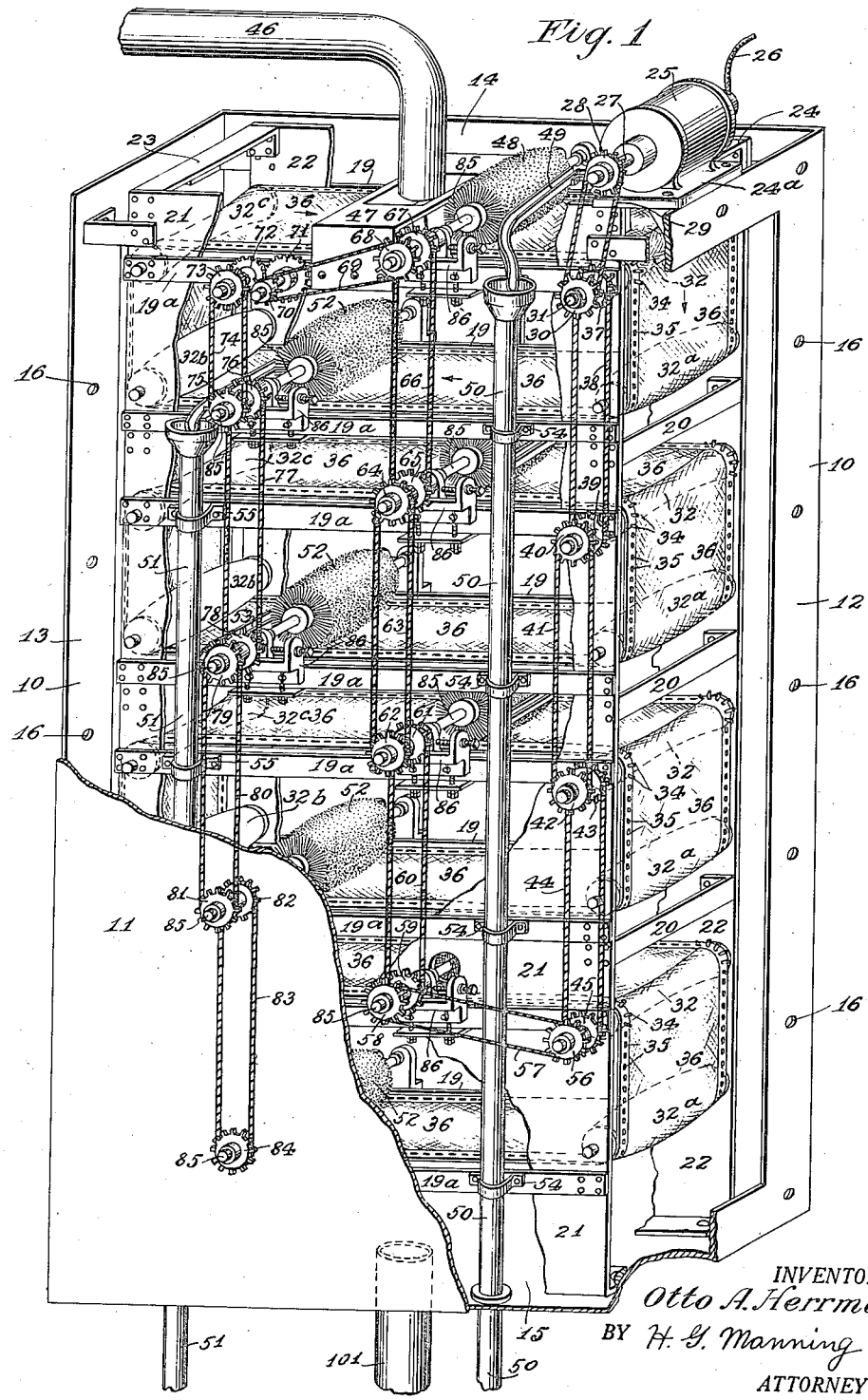
Fig. 1 represents a perspective view of the sewage treating apparatus, with parts broken away to show the interior working mechanism.

Referring now to the drawings in which like reference numerals denote corresponding parts throughout the several views, the numeral 10 represents a casing having a front wall 11, side frames 12 and 13, a rear wall 14 and a bottom wall 15. The side frames 12 and 13 are provided with bolt holes 16 so that side plates 17 may be secured thereto by means of bolts 18 to entirely close the sides of the apparatus. As will be evident, the provision of detachable side plates makes the interior of the apparatus readily accessible to the operator for cleaning or repairing the interior mechanism.

Within the outer casing 10 is an inner casing composed of a series of longitudinal cross bars 19, 19$^a$, a series of end cross bars 20, and a pair of front and rear enclosing plates 21 and 22. The plates 21 and 22 are connected at the top by a pair of U-shaped members 23 and 24, said plates and U-shaped members being riveted or otherwise rigidly secured together. Mounted on the upper edge of the side frame 12 and the plate 24 is the base 24$^a$ of an electric motor 25 receiving current from a suitable conductor 26 and having a horizontal driving shaft 27 extending therefrom.

A gear 28 is mounted upon the outer end of said driving shaft 27 and is connected by means of a sprocket chain 29 to a similar gear 30 on the end of the upper driving shaft 31 journaled in bearings in the plates 21 and 22 and cross bars 19. A concave driving pulley 32 is mounted upon the driving shaft 31, and is provided at its ends with short cylindrical sections 33 upon which are mounted a series of radial teeth 34 adapted to engage in suitable holes 35 at the edge of a flexible filtering endless sieve or screen 36, which may be formed of wire mesh, perforated rubber sheeting, or any other suitable material. The endless screen 36, after passing over the pulley 32, goes downwardly and passes around a convex pulley 32a journaled in bearings in the plates 21 and 22. The screen 36 then passes rearwardly in a horizontal direction, and upwardly around the convex pulley 32b also journaled between the plates 21 and 22. It then passes around the concave pulley 32c and back to the concave driving pulley 32, thus travelling in an endless path. It will be evident that by operating the endless screens with upper concave and lower convex pulleys, the horizontal stretches of said screens will always be curved concave upwardly so that each of said stretches will form a trough for preventing the sewage from falling off at the sides thereof.

In the embodiment of the invention herein illustrated, four sets of endless screens, or filtering units, are employed, the lower three units being practically identical with the first or top unit and being driven by sprocket and gear connection with the driving pulley 32 of the first unit. Thus the pulley shaft 30 of the top unit is provided with an inner gear 37 engaging with a sprocket chain 38, which communicates power to the lower units through the gears 39 and 40, sprocket chain 41, gears 42 and 43, sprocket chain 44 and gear 45.

The raw sewage enters the apparatus through an inlet pipe 46 from which it falls into a funnel guide-box 47 having tapered inner sides, and an open bottom, which directs the sewage upon the top screen 36, without splashing. The liquid portion of the sewage which falls through the upper stretch of the perforated screen 36, impinges upon the lower stretch thereof, where it is refiltered. The solid matter which fails to pass through the upper stretch travels horizontally to the right, as viewed in Fig. 1, where it is collected by a rotary brush 48 revolving in a clockwise direction. The brush 48 is continuously scraped off by means of an inclined scraper-trough 49 as clearly shown in Fig. 3. The sludge collected by the brush 48 is conducted through the trough 49 to a vertical sludge pipe 50 from which it is drawn off from the apparatus to be further treated in any desired manner to convert it into a material suitable for use as a fertilizer.

The sludge collected from the brushes 48 of the top stretches of each of the three lower filtering units is also collected in the common sludge pipe 50. The lower stretches of each of the screens are provided with brushes 52 located at the left hand part of the apparatus and adapted to rotate in a counter clockwise direction to remove the solid matter from said lower stretches. The brushes 52 of the lower stretches of all four screens are scraped by inclined scraper-troughs 53 which deliver the sludge received from the brushes 52 into a common vertical sludge pipe 51. The sludge pipe 50 at the right of the apparatus may be secured to the frames 19 in any suitable manner as by metal brackets 54, while the sludge pipe 51 at the left of the apparatus is preferably secured to the cross frames 19a by means of the metal brackets 55.

The brushes 48 of the upper stretches of the units are driven from the lower gear 45 by means of the gear 56, sprocket chain 57, gears 58 and 59, sprocket chain 60, gears 61 and 62, sprocket chain 63, gears 64 and 65, sprocket chain 66, and gear 67. The brushes 52 on the left-hand side of the apparatus—or lower stretches of the filter units—are operated from the gear 67 by means of a gear 68, sprocket chain 69, gears 70, 71, 72, and 73, sprocket chain 74, gears 75 and 76, sprocket chain 77, gears 78 and 79, sprocket chain 80, gears 81 and 82, sprocket chain 83, and gear 84.

In operation, as will be clear, the liquid which passes through the upper filter unit of the apparatus is refiltered by the three lower filter units. The screens of the four filter units may all be of the same mesh, but preferably should be of gradually diminishing mesh, from the top to the bottom. This arrangement will produce the most efficient separation of the solid from the liquid matter of the sewage.

In order to adjust the brushes relative to their associated screens and troughs, the brush shafts 85 are mounted in bearing members 86, as most clearly shown in Fig. 4. Each of the bearing members 86 is provided with a triangular bottom dovetail section 87 adapted to fit within a dove-tailed slot 88 in an adjusting member 89. The adjusting member 89 is provided with an upwardly extending section 90 having a bolt 91, one end of said bolt being secured at 92 to the bearing member 86. The bearing member or brush carrying member 86 may be horizontally adjusted by manipulating a pair of nuts 93 and 94 located on said bolt 91 at opposite sides of said section 90. During this adjusting operation, the member 86 will be drawn back and forth in its dovetail slot 88.

In order to adjust the brush vertically, the adjusting member 89 is provided with a pair of vertical slots 95 within which extend a pair of bolts 96, having nuts 97 threaded thereon and which may be tightened whenever desired, to hold the member 89 in any adjusted position. A pair of adjusting bolts 98 extend upwardly through a shelf section 99 secured to the cross bar 19 or 19a as the case may be. The bolts 98 are provided with nuts 100 which, when rotated—after the nuts 97 have been loosened—will cause the member 89 and the brush carrying member 86 to move up and down with respect to the cross bar 19 or 19a.

The effluent which passes through the lower unit is collected in the bottom of the apparatus and is delivered through a pipe 101 to an effluent tank 102 containing any suitable purifying materials, such as a layer 103 of coke, a layer 104 of wood charcoal, and a layer 105 of slaked lime, respectively. After the effluent has been purified by the materials in the tank 102, it is conducted from the apparatus through an outlet pipe 106. It may thereafter be disposed of in any desired manner.

While there has been disclosed in this specification one form in which the invention may be embodied, it is to be understood that this form is shown for the purpose of illustration only, and that the invention is not to be limited to the specific form disclosed, but may be modified and embodied in various other forms without departing from its spirit. In short, the invention includes all the modifications and embodiments coming within the scope of the following claim.

Having thus fully described the invention, what is claimed as new, and for which it is desired to secure Letters Patent, is:

In an apparatus for treating sewage, a casing, a series of endless flexible filtering screens having horizontal upper and lower stretches located in said casing, means for delivering raw sewage to the top stretch of the top screen, each of said screens being driven by a pair of upper pulleys and a pair of lower pulleys, the upper pulleys being concave and the lower pulleys being convex, whereby both stretches of said screen will be concave upwardly and will form channels to hold fluent material from falling out, the filtrate from the upper stretch of each screen being refiltered by the lower stretch thereof, and the filtrate from the upper screen being refiltered by the lower screens in succession, each of said screens having a pair of rotary convex brushes in contact therewith for cleaning the sludge therefrom, two vertical rows of inclined troughs engaging said brushes to collect the sludge therefrom, and a pair of common sludge pipes located outside said casing for receiving the sludge from the two vertical rows of troughs respectively.

In testimony whereof, I have affixed my signature to this specification.

OTTO A. HERRMANN.